United States Patent [19]
Mills et al.

[11] Patent Number: 5,628,411
[45] Date of Patent: May 13, 1997

[54] VALVE DEVICES FOR USE IN SORTING APPARATUS EJECTORS

[75] Inventors: Stewart J. Mills, Essex; Kenneth C. Henderson, London, both of England

[73] Assignee: Sortex Limited, London, England

[21] Appl. No.: 347,957

[22] Filed: Dec. 1, 1994

[51] Int. Cl.$^6$ .................................. B07C 5/00; F16K 31/02
[52] U.S. Cl. ...................... 209/644; 251/129.06; 251/368
[58] Field of Search .............................. 209/638, 639, 209/644; 251/24, 129.01, 129.03, 129.05, 129.06, 368

[56] References Cited

U.S. PATENT DOCUMENTS

| | | | |
|---|---|---|---|
| 2,166,763 | 7/1939 | Mason | 310/317 X |
| 2,928,409 | 3/1960 | Johnson et al. | 251/129.06 X |
| 3,229,956 | 1/1966 | White | 251/11 |
| 3,275,285 | 9/1966 | Morris | 251/11 |
| 3,465,732 | 9/1969 | Kattchee | 251/129.06 X |
| 3,669,142 | 6/1972 | Gerbic | 251/24 X |
| 3,683,212 | 8/1972 | Zoltan | 310/328 |
| 4,053,136 | 10/1977 | Perl | 251/11 |
| 4,093,883 | 6/1978 | Yamamoto . | |
| 4,203,522 | 5/1980 | Fraenkel et al. | 209/581 X |
| 4,221,361 | 9/1980 | Weingarten | 251/331 |
| 4,340,083 | 7/1982 | Cummins | 251/129.06 X |
| 4,513,868 | 4/1985 | Culling et al. | 209/587 X |
| 4,545,561 | 10/1985 | Brown | 251/129.08 |
| 4,699,273 | 10/1987 | Suggi-Liverani et al. | 209/587 X |
| 4,903,732 | 2/1990 | Allen | 251/129.06 X |
| 5,079,472 | 1/1992 | Uhl et al. . | |
| 5,203,537 | 4/1993 | Jacobs et al. | 251/129.06 |
| 5,238,223 | 8/1993 | Mettner et al. | 251/129.06 X |
| 5,340,081 | 8/1994 | Wright | 251/129.06 |
| 5,343,894 | 9/1994 | Frisch et al. | 251/129.06 X |
| 5,354,032 | 10/1994 | Sims et al. | 251/129.04 X |

FOREIGN PATENT DOCUMENTS

| | | | |
|---|---|---|---|
| 2093257 | 10/1993 | Canada . | |
| 2664671 | 1/1992 | France . | |
| 5729871 | 2/1982 | Japan | 251/129.06 |
| 3186674 | 8/1991 | Japan | 251/129.06 |

OTHER PUBLICATIONS

English Translation of French Patent Application No. 2,664, 671, filed Jul. 12, 1990, published Jan. 17, 1992, bulletin 92/03, for *Valve and Multi–Channel Distribution Device, Particularly for Corrosive Fluids*, inventors: Jean Neimark and Jacques Ponsignon.

*Primary Examiner*—William E. Terrell
*Assistant Examiner*—Tuan Nguyen
*Attorney, Agent, or Firm*—Majestic, Parsons, Siebert & Hsue

[57] ABSTRACT

A valve device is disclosed for controlling the delivery of gas from a pressurised source suitable for use in a pneumatic ejector in particle sorting apparatus. It uses a diaphragm as a valve member disposed over an output port from a chamber which is in substantially continuous communication with a source of gas or air under pressure. Both sides of the diaphragm are exposed to pressurised gas or air in the chamber. For this reason, and because the diaphragm itself engages the output port to close it, when the input pressure is applied there is a differential pressure which elastically deforms the diaphragm to close the output port. The diaphragm has a piezoelectric element, and the valve device includes an electric circuit operable to selectively activate the piezoelectric element and withdraw the valve member from the output port to admit pressurised gas or air thereinto.

20 Claims, 5 Drawing Sheets

VALVE DEVICES FOR USE IN SORTING APPARATUS EJECTORS

BACKGROUND OF THE INVENTION

This invention relates to pneumatic ejectors for use in sorting apparatus in which material to be sorted is directed in a product stream following an aerial path, and rejected material is removed from the stream by air pulses from such ejectors. Particularly, it relates to valve devices for use in the ejectors to control the delivery of air from a pressurised source to the ejector nozzle directed at a particular section of the product stream. Although described with reference to sorting apparatus, it will be recognised that the invention will have application in other technical fields where the delivery of a gas under pressure calls for careful and accurate control.

Pneumatic ejectors are now commonly used in sorting apparatus. Essentially, each will comprise a nozzle connected via a valve device to a source of pressurised air. An operating mechanism, normally comprising an electric circuit, acts to open the valve device selectively in response to a control signal to deliver a pulse of pressurised air to, and thus from the respective nozzle. As the operating speeds for sorting apparatus increase, so must the action and response of valve devices in the ejectors.

Many current sorting apparatus using pneumatic ejectors grade particulate material according to its ability to reflect light. Typical such apparatus are described in U.S. Pat. Nos. 4,203,522; 4,513,868; and 4,699,273, the disclosures whereof are incorporated herein by reference. In apparatus disclosed in the '522 Patent detectors are responsive to light reflected from the particles and generate signals indicative of different qualities of the product. These signals are compared and analysed, to generate a comparison signal which can activate an ejector to remove the relevant particle from the product stream. An ejector in these apparatus will normally use an electrically actuated valve such as a moving iron disc or plate valve to discharge pulses of pressurised air selectively to remove particles from its respective target area.

Air valves of various kinds have been developed based on piezoelectric actuators. A typical piezoelectric actuator has one or more lamina of piezoelectric ceramic bonded together, or to an additional non-piezoelectric laminar such as a metal plate, to form a bimorph or multimorph structure. An electrical voltage is applied to the piezoelectric ceramic laminar through a layer of metallisation across the piezoelectric laminar structure or diaphragm. The electrical voltage causes the piezoelectric ceramic to expand or contract depending on the polarity. When one expanding or contracting laminar is bonded to another which expands in the opposite direction, or to a laminar that does not change dimensions, the resulting structure will bend when an electrical signal is applied. Thus in a valve device, the actuator may be positioned to cover a valve orifice, or hold another object over the valve orifice, in one electrical state; and to move away from the orifice and open the valve in another electrical state.

Piezoelectric actuated valves are disclosed in U.S. Pat. Nos. 5,079,472 and 5,343,894, and Canadian Patent Specification No. 2,093,257, to which reference is directed.

SUMMARY OF THE INVENTION

The present invention is directed at a valve device for controlling the delivery of gas from a pressurised source which would be suitable for use in a pneumatic ejector in sorting apparatus of the type described above. It uses a piezoelectric element in a valve member disposed over an output port from a pressure chamber which has an input for providing substantially continuous communication with a source of gas or air under pressure. The valve member can be selectively withdrawn from the output port to admit pressurised gas or air thereinto. The piezoelectric element is part of a diaphragm in the pressure chamber, both sides of which are exposed to the input port pressure. Because the diaphragm itself is only a short distance from the port in the open position, when input pressure is applied there is a differential pressure on the diaphragm which elastically deforms the diaphragm to close the output port. Once closed the differential pressure between the input and output ports holds the diaphragm in the closed position. An electrical circuit is operable to selectively activate the piezoelectric element to withdraw the diaphragm from the output port.

The differential pressure on the diaphragm is of course related to the cross-sectional area of the output port which isolates substantially the same area of diaphragm from the pressure chamber when the valve is closed. In the closed position the diaphragm is in a state of equilibrium with the differential pressure force balanced by the elastic stress in the diaphragm. In use, the valve device will normally be adjusted such that there is minimal pressure between the diaphragm and the output port in its closed position, thus minimising the force required to be generated by the piezoelectric element to move the diaphragm from the output port. When the piezoelectric element on the diaphragm is actuated and the diaphragm withdraws from the output port, the reduced differential pressure applied to this area of the diaphragm, results in accelerated movement of the diaphragm away from the output port. This "snap" action of the diaphragm is of course of considerable value in a valve that may have to operate at very high frequencies.

The piezoelectric element in valve devices according to the invention can be a bonded laminate of piezoelectric materials, forming a bimorph or multimorph structure, or comprise one or more layers or piezoelectric material bonded to a metal substrate such as a metal plate. The latter arrangement is preferred, and a typical valve device of the invention comprises a circular diaphragm in which a disc of piezoelectric ceramic is bonded to a metallic disc, typically of brass. The side bearing the piezoelectric material will normally face the output port, and where the exposed face of the piezoelectric material has been metallised, the metallised coating may be smoothed or removed in the area that engages the output port to enhance the seal. Removal of a metallised coating of a piezoelectric element in a valve member is described in U.S. Pat. No. 5,079,472, referenced above. However, a total seal is not critical to the successful operation of a valve device according to the invention in its preferred application, and indeed some leakage can be an advantage.

The net balance of force on the diaphragm over the output port can be adjustable. In the preferred construction of the valve device the output port is adjustable in the housing, or formed in a section of the housing which is secured by an adjustable mounting mechanism. Adjustment of the mounting mechanism alters the position of the output port on the housing body and thereby relative to the diaphragm in the closed position. Particularly, this adjustment can be made while the discharge chamber is under pressure. In this way, the seal between the output port and the diaphragm can be steadily improved until a sufficient seal is established under working conditions. A sufficient seal can be total, or provide for controlled leakage at a desired level.

The preferred application of a valve device according to the invention is in the pneumatic ejectors used in sorting apparatus. In such apparatus, the ejectors have not only to be reliable over many cycles of use, but have also to be operable at great speed and high frequency. For these reasons, the movement of the diaphragm to open and close the output port has to be accomplished with minimum unnecessary movement. For this reason, it is appropriate to include in valve devices according to the invention a stop behind the diaphragm to limit the extent of its withdrawal from the output port in response to the piezoelectric element being activated, and also to minimise extraneous movement. An electrical damping technique may also be employed. In these respects, reference is directed to U.S. Pat. No. 2,166,763 which describes in detail how a piezoelectric bending element subject to high frequency movement can be damped both electrically and mechanically.

Pneumatic ejectors in sorting apparatus of the kind referred to above must be as small as possible to enable the maximum number of ejectors to be arranged over a given section of product stream. As a consequence, it may not be practical to construct ejector or valve device housings in substantially rigid bodies. Accordingly, relatively thin walled housings may be used, normally formed in a plastics material. While this can result in some inherent flexibility, the preferred design of a device according to the invention allows this flexibility to be exploited. Particularly, by properly matching the piezoelectric composite and plastics housing material, valve devices according to the present invention can tolerate higher input pressure fluctuations; of the order of ±10%, than would be tolerated if the housing were rigid. However, utilising the flexibility of the plastics housing material does require adjacent housings in a battery of ejectors for example, in sorting apparatus of the kind referred to above to be spaced from one another, albeit only slightly.

Where the housings in valve devices according to the invention are made of plastics material, consideration must be given to the sensitivity of the material to temperature changes. Particularly, such materials tend to weaken on heating, which can significantly effect the performance of a device. When used in sorting apparatus, ejectors embodying the invention are normally supplied with compressed air from a refrigeration dryer in which the air is first cooled to a temperature of 2° to 3° C., and then allowed to warm to around 15° C. when it is fed to the respective input ports. The ejectors are therefore designed to operate at around 15° C., and features can be built in to the ejectors which enable a flow of pressurised air to assist in maintaining the latter at a substantially constant temperature and particularly, by ensuring that there is some leakage of pressurised air through the ejector housing, the pressurised air acts as a temperature stabiliser. This can be accomplished by the provision of a bleed duct from the pressure chamber, which may include a control valve to vary the flow rate.

The design of a valve device according to the invention makes it particularly suitable for use in a pneumatic ejector for sorting apparatus which has a plurality of discharge nozzles mounted therein. In such an embodiment, the ejector has a housing defining a pressure chamber with a plurality of output ports each connected to an ejector nozzle; a diaphragm disposed in juxtaposition with each output port and comprising a piezoelectric element; and an input for connection to a source of pressurised gas, which input communicates with the chamber on both sides of each diaphragm. An area of each diaphragm is disposed in juxtaposition with its respective output port and each diaphragm is adapted to be elastically deformed by differential input gas pressure over said area thereof such that said area closes the respective output port. A particularly preferred ejector has two output ports each in a discrete region of the pressure chamber with the sides of the diaphragms facing their respective output ports and the said regions and the region between the diaphragms being in communication with the input. Each output port is connected to a delivery duct terminating in an ejector nozzle. The two diaphragms may define between them a central chamber which will normally have disposed therein a stop for limiting the extent of withdrawal of each diaphragm from its adjacent output port, and the output ports and the stop are preferably in substantial alignment. In all embodiments of the invention, the respective diaphragms are preferably substantially circular in outline, and adapted to engage output ports located on the axis of the circle.

Other features and advantages of the present invention will be apparent from the following description of a preferred embodiment. Reference will be made to the accompanying schematic drawings.

DESCRIPTION OF PREFERRED EMBODIMENTS

Figure 1:
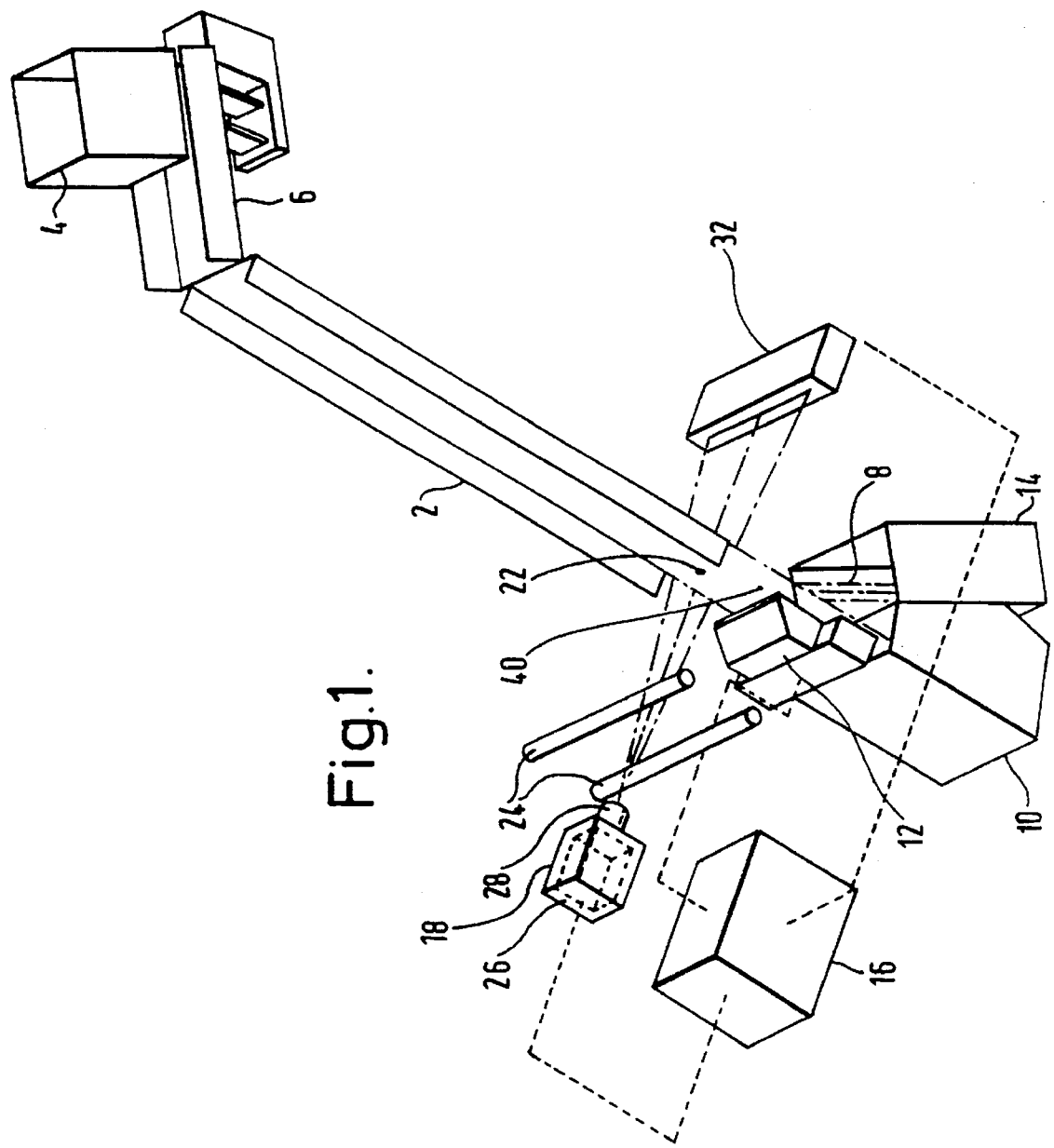
FIG. 1 illustrates diagrammatically the operation of colour sorting apparatus.

FIG. 1 illustrates a chute 2 to which particulate material is fed from a hopper 4 via a vibrator tray 6. The chute 2 directs material in a product stream to a receptacle 10. During its passage from the end of the chute 2 to the receptacle 10, the material is kept in the product stream solely by its own momentum. Ejectors are arranged in a battery 12 which extends over the width of the product stream, and are operable to remove particles from specific zones of the product stream by high pressure air jets. Removed particles 8 are directed towards a reject receptacle 14. Typically, the lateral width of the product stream is 8 inches, with for example, thirty-two ejector nozzles equally spaced thereover. The ejectors 12 are instructed by a computer or microprocessor 16, which itself receives input data from the scanning system 18 described below.

Reference numeral 22 indicates a region in the product stream where the product is scanned. Region 22 is illuminated by a light source 24, and particles in the region 22 reflect light which is received in the scanning assembly 18. The assembly 18 comprises a camera 26, lens 28, and the camera 26 includes a charge coupled device which monitors light received from particles in the product stream. The charge coupled device in the camera 26 is arranged to view the entire lateral dimension of the product stream. The apparatus has an illuminated background provided by a lamp element 32. Its brightness is normally adjustable to match good product.

The signals generated by the camera 26 are passed to a computer 16. If a particle is defective, then the computer 16 instructs an ejector in the battery 12 to remove that particle from the stream by the delivery of an air pulse to the appropriate section of the stream in the removal zone 40. Such removed particles 8 are deflected from the path of the product stream into the reject receptacle 14.

Figure 2:
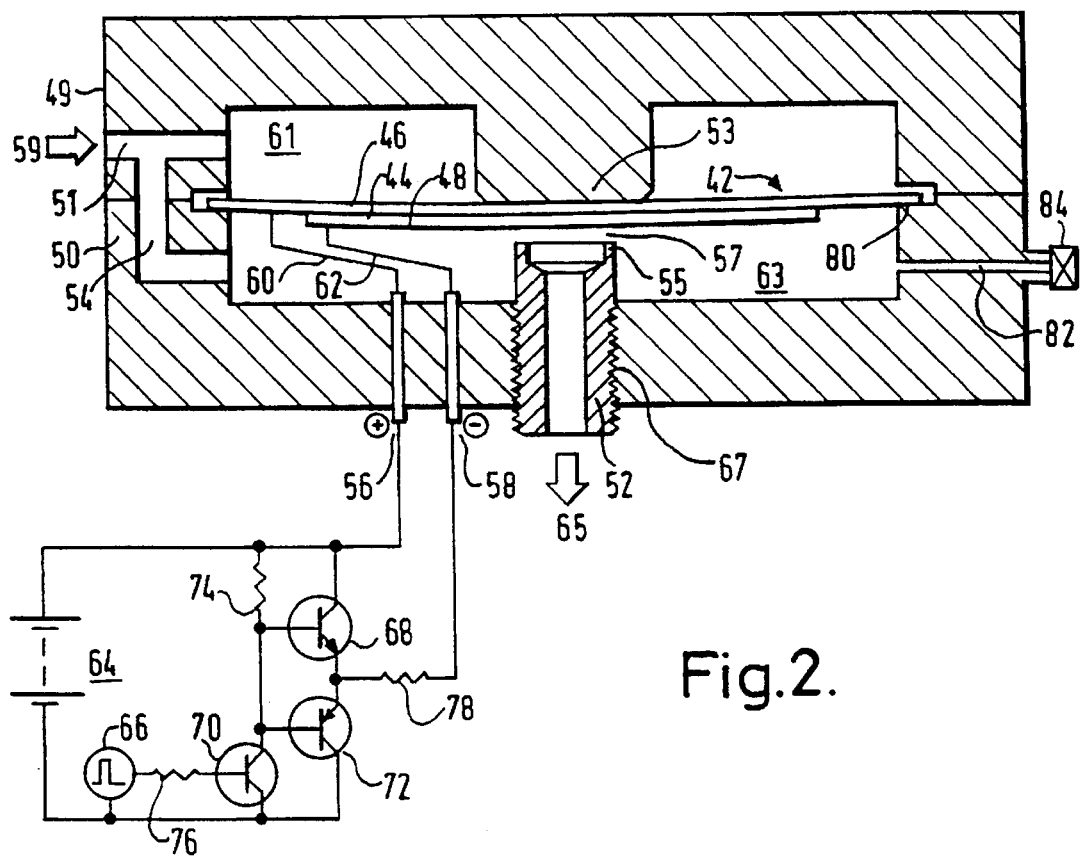
FIGS. 2 and 3 are cross-sectional views illustrating the operation of a valve device according to the invention.
Figure 3:
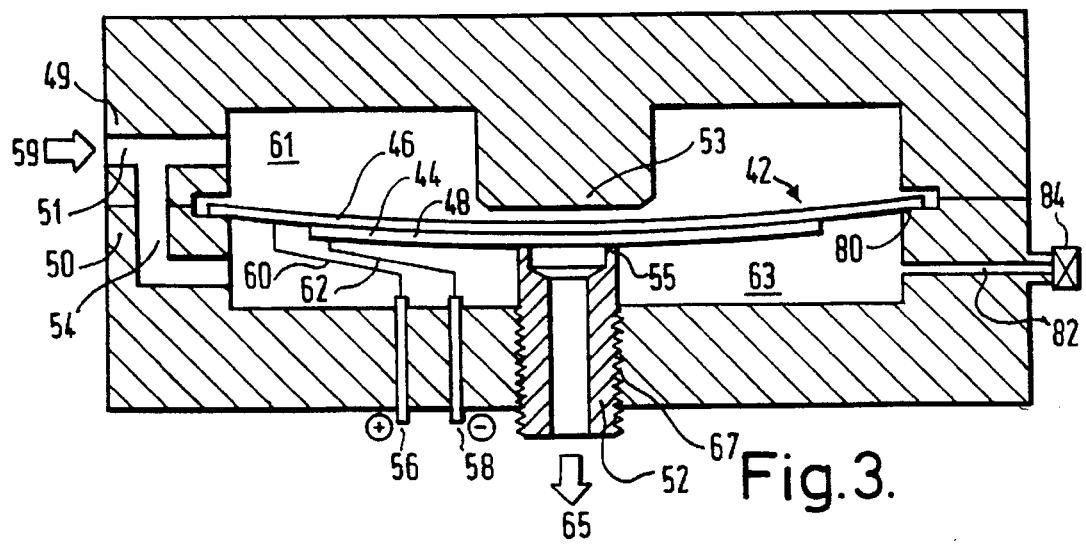

The ejectors in the array or battery 12 have nozzles directed towards particular target areas, and are connected to a source of air under pressure. Each ejector includes a valve device according to the invention, and FIGS. 2 and 3 illustrate the operation thereof. The essential component of the device is a valve element in the form of an actuator diaphragm 42. As shown, the actuator diaphragm 42 comprises a disc 44 of piezoelectric ceramic bonded to a brass disk base plate 46 with glue. The piezoelectric disc 44 has a metallised layer 48, and is polarised in the direction away from the base plate 46.

The actuator diaphragm 42 is mounted within a valve housing comprising sections 49 and 50. The lower section 50 has an outlet port 52 forming a valve seat 55 and connection 54. The output 52 is mounted in the housing section 50 in a screw thread 67, and can thus be adjusted to set the position of its valve seat 55 relative to the diaphragm 42. The section 50, which is constructed of an insulating plastic and is resiliently flexible, also contains air tight electrical connecting rods 56, 58 which allow external connection of a driving voltage to the actuator surface 48 and base plate 46, via internal wires 60, 62. The wires 60, 62 are of thin flexible construction to allow free movement of the actuator diaphragm 42.

The driving voltage is derived from a high voltage direct current power source 64, which is switched under the control of a signal generator 66 with a buffer comprising transistors 68, 70, 72 and resistors 74, 76. When the valve is to be used in a particle sorting system, the signal generator 66 is replaced by a signal source which corresponds to the presence of unwanted particles in the particle stream. The driving voltage is shaped by the resistor 78, and the inherent capacitance of the piezoelectric ceramic 44, into an exponential ramp waveform.

The upper valve housing section 49 contains the inlet 51, a portion of the connection 54 and stop 53. The actuator diaphragm 42 is held in place by its outer edge which rests on a circular rim 80 on the lower section 50. The distance between the outer support rim 80 and the valve seat 55 is controlled so that when the valve is assembled and in a depressurised state, a small gap 57 is maintained between the actuator diaphragm 42 and the valve seat 55.

When the valve is initially pressurized by supply air 59, it changes from the state shown in FIG. 2 to that shown in FIG. 3. This change is caused by a force resulting from a differential pressure acting on the valve plate 42. The differential pressure arises because the outlet port 52 is at a low pressure nearly equal to atmospheric, and thus much lower than the pressure in chamber 61, 63, and because of the small spacing between the diaphragm 42 and the output port 52. This spacing is normally no more than 5 thousandths of an inch and usually in the range 2–3 thousandths of an inch.

The pressure differential urges the diaphragm 42 toward the valve seat 55. Once the diaphragm 42 closes against the seat 55, the air flow through the gap 57 is reduced to an insignificant level and the valve is now closed as shown in FIG. 3. The pressure difference between the supply pressure in chamber 61, 63 and the exhaust pressure (atmospheric) in outlet port 52 acts across the area of the actuator diaphragm 42 that is enclosed by the valve seat 55. This pressure differential acting on this area provides the force required to hold the actuator diaphragm 42 in the closed position against the elastic stresses in the diaphragm 42. Appropriate adjustment of the position of the output port 52 can ensure that the diaphragm is in substantial equilibrium for a given input pressure with the contact pressure between the diaphragm 42 and the valve seat 55 substantially zero.

When a DC voltage 64 of polarity shown in FIG. 2 is applied to terminals 56 and 58, the piezoelectric ceramic disc 44 contracts radially, causing the actuator diaphragm 42 to bend away from the valve seat 55, and open the valve.

It is desirable for this valve to operate at high pressure, as this enables the production of a high pressure output pulse sufficient to remove unwanted particles when used in a particle sorting application. A typical pressure for particle sorting is in the range 30 to 40 psi. At the desired pressure, the piezoelectric force alone would be insufficient to overcome the force holding the valve closed, as described above. The valve construction is such that the gap 57 becomes closed as the actuator diaphragm 42 is further deformed when the air pressure is applied. This pre-loads the actuator diaphragm with a force which is in the direction that assists opening of the valve. Hence the piezoelectric force required to open the valve is reduced.

Ejectors in particle sorting apparatus must be able to operate at great speed and frequency, sometimes well in excess of 500 cycles/sec. To achieve this capability the pneumatic pulse generated in an ejector having a valve device of the type just described must start and finish abruptly, so that the ejection pulse will then have full pressure while the unwanted particle is present (to maximize ejection force). This is achieved by the pre-loading of the actuator diaphragm 42 which causes the valve to snap open when the piezoelectric ceramic disc 44 is energized. The pressure differential described above causes the valve also to snap closed when the piezoelectric ceramic disc 44 is de-energized. The snap action of the valve also enables the opening and closing times to be accurately predicted. This is particularly useful in a particle sorting system which requires precise timing of ejector pulses to ensure that the ejectors remove only unwanted particles from the product stream.

The pressure profile of the ejection pulse should be flat with minimal overshoot and minimal oscillation, so that in a sorting apparatus there is a uniform force available to remove unwanted particles. Overshoot and oscillation of the ejector valve pneumatic output pulse is primarily due to the valve plate oscillating at its mechanical resonant frequency. Two solutions to this problem are incorporated in the design of valve devices according to the invention:

i) When the valve is open the air flow causes the valve plate to oscillate like a 'reed'. If the valve is open for an extended period of time, this oscillation builds up to a large level. If the position of the backstop 53 is set so that it is touching the valve plate 42 at its nominal position when the valve is open, then this oscillation is arrested. Another effect of stopping the valve plate oscillation is to reduce the valve closing time. Without the backstop 53 the valve has a longer closing time. This mechanical limiting of motion has been applied to piezoelectric relays as disclosed in U.S. Pat. No. 2,166,763.

ii) When the actuator diaphragm 42 is driven from a square wave voltage source at terminals 56 and 58, it hits the valve seat 55 and backstop 53 at full velocity and tends to bounce causing oscillation in the output pressure in port 52. To solve this problem, the actuator diaphragm 42 is driven with a series resistor 78 to form an exponential ramp voltage on the inherent piezoelectric capacitance of the actuator diaphragm 42. The exponential ramp driving voltage decelerates the opening and closing motion of the actuator diaphragm 42 as it approaches the open or closed positions. This form of electrical damping of piezoelectric relays is also disclosed in U.S. Pat. No. 2,166,763.

The above construction enables the diaphragm 42 to move to a closed position with the differential air input pressure just balancing elastic forces in the diaphragm tending to hold the valve open. In this position there is little pressure exerted on the valve seat 55, and hence little wear, leading to a long operational life. When the driving voltage is applied, the movement of the diaphragm 42 away from the seat 55 is limited by a stop of relatively large area, which may be adapted to the shape of the diaphragm to further minimise wear thereon.

In ejectors used in sorting apparatus of the general type shown in FIG. 1, the operating temperature should be maintained substantially steady. To provide for cooling using air from the source, the device of FIGS. 2 and 3 can include one or more bleed ducts 82, which may be equipped with valves 84 to provide for variable flow therethrough. By this means, air from the source can flow through the device, thereby controlling its temperature at a desired level. Some leakage may also be permitted into the output port 52, but this may be insufficient to provide temperature control.

Figure 4:
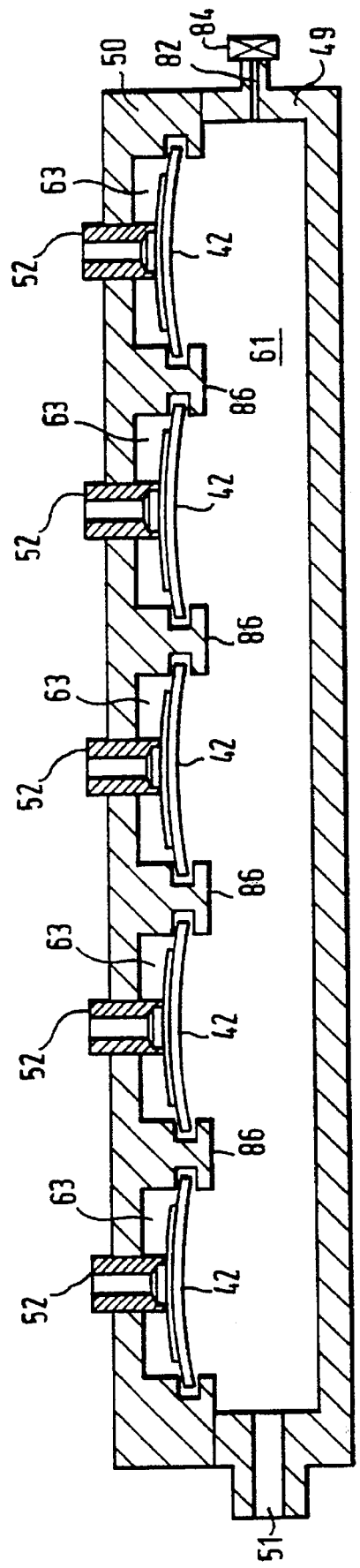
FIG. 4 is a cross-sectional view illustrating a multiple valve variant of the device shown in FIGS. 2 and 3.

In the multiple valve device shown in FIG. 4, five output ports 52 are mounted in one housing section 50. These ports are closed by respective diaphragms 42 supported around their peripheries in cylindrical mounts 86. The mounts 86 have openings therein to ensure that the chamber 63 behind the diaphragms 42 is maintained at the same pressure as the main chamber 61. A bleed duct 82 is formed in housing section 49, and coupled to control valve 84 to provide for a variable flow of air through the device for cooling. As in the embodiment of FIGS. 2 and 3, the outlet ports 52 are adjustably mounted in the housing section 50. This enables each to be set relative to its respective diaphragm to minimise contact pressure therebetween in the closed position. Stops (not shown) may also be included to limit the movement of the diaphragms 42 away from their respective output ports 52.

Figure 5:
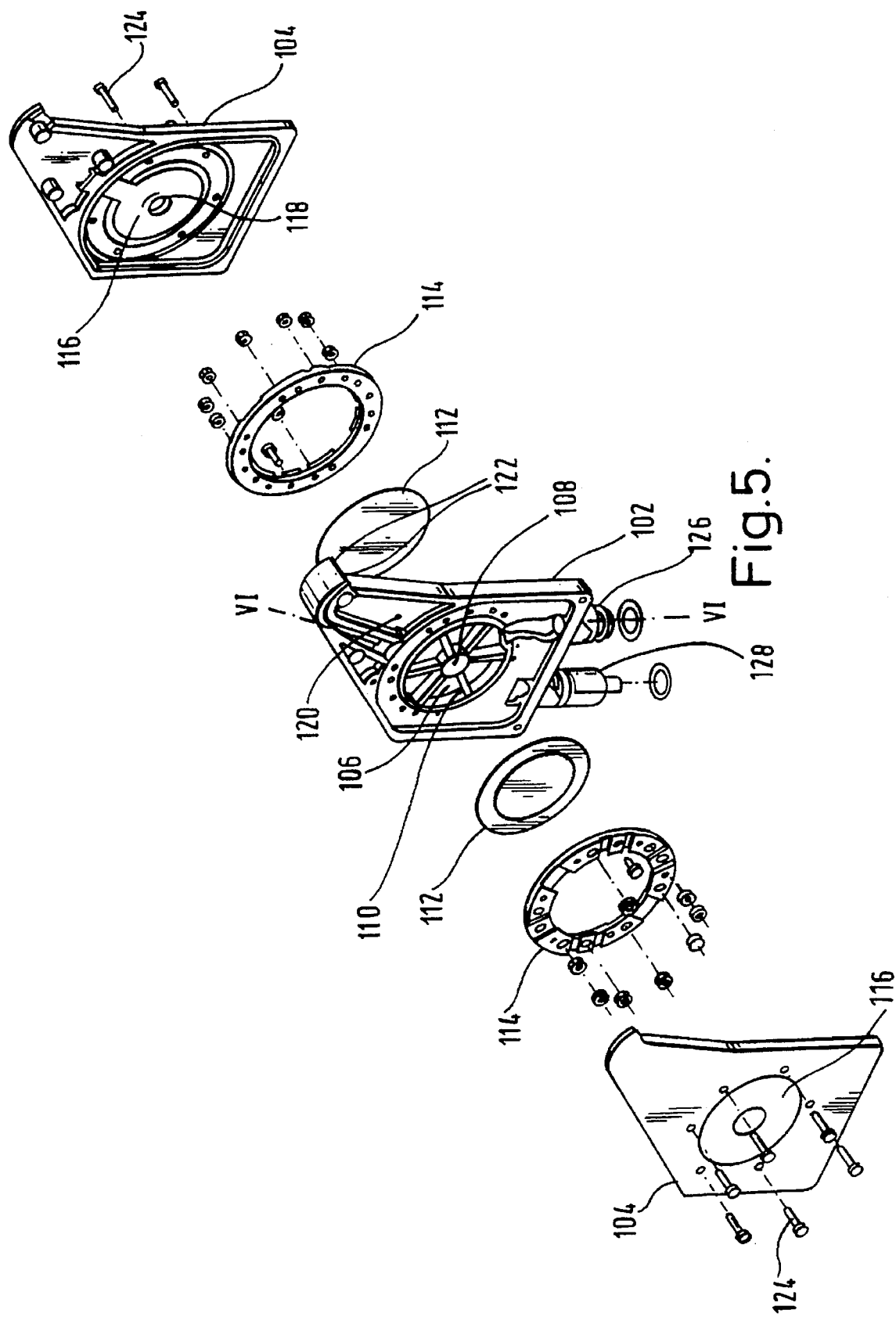
FIG. 5 is an exploded view of a dual nozzle pneumatic ejector embodying the invention.
Figure 6:
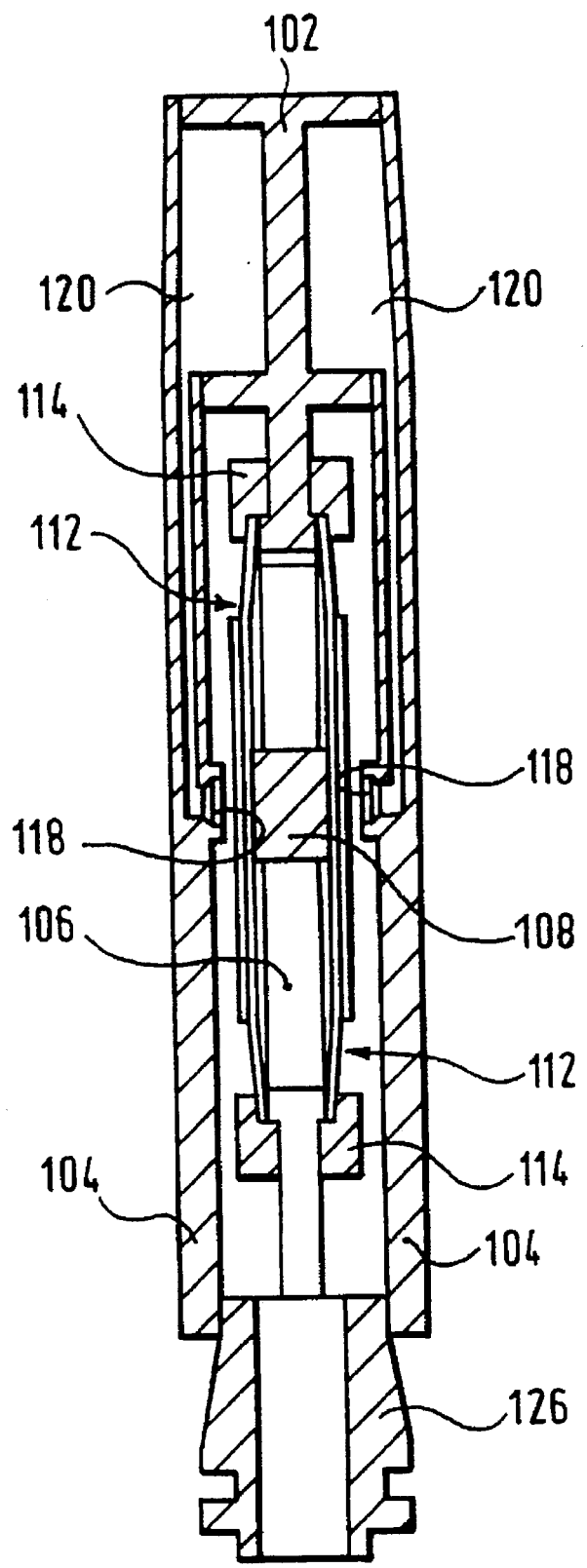
FIG. 6 is a sectional view taken generally on line VI—VI of FIG. 5.

The dual nozzle ejector unit shown in FIGS. 5 and 6 comprises essentially a pair of valve devices which each operate in the manner of that described above with reference to FIGS. 2 and 3, but disposed back to back, and sharing a common central chamber behind each actuator diaphragm. The ejector housing comprises a central section 102 and two side sections 104. The central section 102 has a cylindrical opening 106 in which a central boss 108 is supported on spokes 110. At the ends of the cylinder 106 are located actuator diaphragms 112, each comprising a laminate of the kind illustrated in FIG. 2. The diaphragms 112 are held in place by non-sealing locating rings 114 which are themselves held in place by being anchored to each other by bolts extending through the central section 102 as indicated.

The side sections 104 are mounted directly on the central section 102, and have regions 116 which directly overlay the locating rings 114. Centrally located on each of regions 116 is an outlet port 118 which, in the assembled unit, is in communication with a delivery duct 120 defined between the central section 102 and each side section 104. The two delivery ducts 120 lead to respective ejector nozzles 122.

The zone defined between each diaphragm 112 and region 116 of a side section within the clamping ring 114 constitutes a discharge chamber equivalent to the chamber 63 in the device shown in FIG. 2. However, in the unit shown in FIGS. 5 and 6 this chamber has provision for adjustment which can vary the mounting of the output port 118 relative to the central section 102, and thereby the operating characteristics of the respective valve. Six screws 124 disposed around the periphery of region 116 cooperate with the central section 102 and the clamping ring 114 to enable the output port to be moved toward or away from the stop 108 and thereby the diaphragm 112. This facility exploits the flexibility of each side section 104, and provides for the unit to be adjusted as it is assembled to provide the sealing between the diaphragm and the output port when the valve is in the closed position.

The unit shown in FIG. 5 has a single air inlet port 126 which enables fluid under pressure to be delivered to the central chamber 106 and the two discharge chambers defined within the clamping rings 114. A connector 128 is provided for connecting a driving circuit to the piezoelectric disc on each diaphragm 112, again substantially in the manner described above with reference to FIGS. 2 and 3.

In a battery 12 of ejectors as shown in FIG. 1 a plurality of units of the kind shown in FIG. 4 can be arranged side by side. A small spacing should be provided between adjacent units to allow for flexure of the region 116 of the side sections 104. To prevent the ingress of dirt between units which could inhibit such flexure, annular seals may be fitted around the peripheries of the regions 116.

The embodiments of the invention described herein are given by way of example only, and numerous variations can be made within the spirit and scope of the invention disclosed herein. Particularly, features disclosed in one embodiment can readily be utilised in another, although not specifically referred to therein.

We claim:

1. A pneumatic ejector for sorting apparatus in which material to be sorted is directed in a stream following an aerial path, and rejected material is removed from the stream by air pulses from such ejectors, which ejector has a housing defining a pressure chamber; a diaphragm mounted in the housing and comprising a piezoelectric element; an input for connection to a source of pressurised gas, which input communicates with the chamber on both sides of the diaphragm; and an output port connecting the chamber on one side of the diaphragm to a delivery duct terminating in an ejector nozzle, an area of the diaphragm being disposed in juxtaposition with the output port and the diaphragm being elastically deformable by differential input gas pressure over said area thereof such that said area closes the output port with said differential pressure balanced by elastic forces in the diaphragm such that the exerting pressure between the diaphragm and the periphery of the output port is substantially zero, the ejector including an electric circuit selectively operable to activate the piezoelectric element to withdraw said area of the diaphragm from the output port to the admit gas from the pressure chamber to the output port, and thence to the ejector nozzle.

2. A pneumatic ejector according to claim 1 wherein the housing is formed with a bleed duct from the chamber permitting a steady flow of gas through the chamber for controlling the temperature thereof.

3. A pneumatic ejector according to claim 2 including a valve in the bleed duct for controlling the flow of gas therethrough.

4. A pneumatic ejector according to claim 1 wherein the pressure chamber has the shape of a cylinder with said diaphragm traversing the axis thereof and the output port substantially on said axis, and wherein the input is disposed on the periphery of the cylinder.

5. A pneumatic ejector according to claim 1 wherein the output port is mounted on a resiliently flexible section of the housing.

6. A pneumatic ejector according to claim 1 wherein the position of the output port in the housing is adjustable to establish an engagement pressure between the diaphragm and the periphery of the output port in the closed position of substantially zero under a given input pressure.

7. A pneumatic ejector according to claim 1 wherein a piezoelectric portion of said diaphragm is in juxtaposition to the output port.

8. A pneumatic ejector according to claim 1 wherein the housing is formed with a stop behind said diaphragm for limiting the extent of its withdrawal from the output port in response to activation of the piezoelectric element.

9. A pneumatic ejector according to claim 1 wherein the pressure chamber has the shape of a cylinder with said diaphragm traversing the axis thereof and the output port substantially on said axis, the diaphragm dividing the pressure chamber into discrete sections, and the housing including means communicating the input to both sections.

10. A pneumatic ejector according to claim 1 including an electronic damping circuit for the piezoelectric element.

11. A pneumatic ejector unit for sorting apparatus in which material to be sorted is directed in a stream following an aerial path, and rejected material is removed from the stream by air pulses from such ejectors, which ejector has a housing defining a pressure chamber with a plurality of output ports each connected to an ejector nozzle; a diaphragm disposed in juxtaposition with each output port and comprising a piezoelectric element; and an input for connection to a source of pressurised gas, which input communicates with the chamber on both sides of the diaphragm, wherein an area of each diaphragm is disposed in juxtaposition with its respective output port and each diaphragm is elastically deformable by differential input gas pressure over said area thereof such that said area closes the respective output port with said differential pressure balanced by elastic forces in the diaphragm such that the exerting pressure between the diaphragm and the periphery of the output port is substantially zero, the ejector unit including an electric circuit selectively operable to activate the piezoelectric elements to withdraw the diaphragms from the output port to admit gas from the pressure chamber to the ejector nozzles.

12. A pneumatic ejector unit according to claim 11 wherein the housing is formed with a bleed duct from the chamber permitting a steady flow of gas through the chamber for controlling the temperature thereof.

13. A pneumatic ejector unit according to claim 11 having two output ports each in a discrete region of the pressure chamber with the sides of the diaphragms facing their respective output ports and the said regions and the regions between the diaphragms being in communication with the input.

14. A pneumatic ejector unit according to claim 13 wherein the diaphragms define a central chamber region with output port regions on either side thereof.

15. A pneumatic ejector according to claim 14 including a stop disposed in the central region for limiting the extent of withdrawal of each diaphragm from its adjacent output port in response to activation of the respective piezoelectric element.

16. A pneumatic ejector according to claim 15 wherein the pressure chamber is substantially cylindrical with the output ports and the stop substantially aligned on the axis thereof.

17. A pneumatic ejector according to claim 13 further having a plurality of ejectors arranged side by side in an array with space therebetween.

18. A pneumatic ejector according to claim 11 wherein the position of each output port in the housing is adjustable to establish an engagement pressure between the diaphragm and the periphery of the output port in the closed position of substantially zero under a given input pressure.

19. A pneumatic ejector according to claim 11 including an electronic damping circuit for the piezoelectric element.

20. A pneumatic ejector for sorting apparatus in which material to be sorted is directed in a stream following an aerial path, and rejected material is removed from the stream by air pulses from such ejectors, which ejector has a housing comprising a central section and two side sections, each side section having a respective output port formed therein, and being attached to the central section by an adjustable mounting mechanism, the housing defining a pressure chamber; a diaphragm mounted in the housing and comprising a piezoelectric element; an input for connection to a source of pressurised gas, which input communicates with the chamber on both sides of the diaphragm; and an output port connecting the chamber on one side of the diaphragm to a delivery duct terminating in an ejector nozzle, an area of the diaphragm being disposed in juxtaposition with the output port and the diaphragm being elastically deformable by differential input gas pressure over said area thereof such that said area closes the output port, whereby the closure pressure between an output port and a respective diaphragm is altered by adjustment of said mounting mechanism, the valve device including an electric circuit selectively operable to activate the piezoelectric element to withdraw said area of the diaphragm from the output port to the admit gas from the pressure chamber to the output port, and thence to the ejector nozzle.

* * * * *